United States Patent
Mähner

(10) Patent No.: US 6,584,215 B1
(45) Date of Patent: Jun. 24, 2003

(54) METHOD AND APPARATUS FOR THE REAL TIME DETERMINATION OF DEFORMATION OF TEST PIECES

(76) Inventor: Bernward Mähner, Daisenbergstrasse 1, D-83607 Holzkirchen (DE)

(*) Notice: Subject to any disclaimer, the term of this patent is extended or adjusted under 35 U.S.C. 154(b) by 0 days.

(21) Appl. No.: 09/545,197

(22) Filed: Apr. 7, 2000

Related U.S. Application Data

(63) Continuation of application No. 09/471,186, filed on Dec. 23, 1999, now abandoned.

(30) Foreign Application Priority Data

Dec. 23, 1998 (DE) .................................... 198 59 801

(51) Int. Cl.$^7$ ................................................. G06K 9/00
(52) U.S. Cl. ........................................ 382/108; 382/152
(58) Field of Search ............................... 382/100, 108, 382/141, 152, 274, 298; 708/205; 430/50; 72/37

(56) References Cited

U.S. PATENT DOCUMENTS

| | | | | |
|---|---|---|---|---|
| 5,091,776 A | * | 2/1992 | Tyson, II | 348/61 |
| 5,467,184 A | * | 11/1995 | Tenjimbayashi | 356/35.5 |
| 5,481,356 A | * | 1/1996 | Pouet et al. | 356/35.5 |
| 5,648,997 A | * | 7/1997 | Chao | 378/98.4 |
| 5,719,395 A | * | 2/1998 | Lesniak | 250/330 |
| 5,817,945 A | * | 10/1998 | Morris et al. | 73/800 |
| 5,946,102 A | * | 8/1999 | Holcomb | 356/417 |
| 5,987,159 A | * | 11/1999 | Nichani | 382/141 |
| 6,122,408 A | * | 9/2000 | Fang et al. | 382/274 |
| 6,280,386 B1 | * | 8/2001 | Alfano et al. | 600/431 |
| 6,393,315 B1 | * | 5/2002 | Aprahamian et al. | 600/476 |
| 6,396,949 B1 | * | 5/2002 | Nichani | 382/173 |

FOREIGN PATENT DOCUMENTS

| | | | |
|---|---|---|---|
| DE | 36 00 672 | 7/1987 | G01B/11/16 |
| DE | 195 01 073 | 8/1996 | G01B/11/16 |
| DE | 197 16 785 | 10/1998 | G01B/11/16 |

OTHER PUBLICATIONS

W. Steinchen et al., "Schwingungsanalyse mittles Digital Shearografie," *Technisches Messen* 64 (1997) 6, pp. 223–229.

W. Steinchen et al., "Dehnungsmessung mit digitaler Shearografie," *Technisches Messen* 62 (1995) 9, pp. 337–341.

J. Pfeiffer et al., "Dridimensionale optische Vermessung von Zähnen," *Technisches Messen* 63(1996) 6, pp. 254–261.

* cited by examiner

*Primary Examiner*—Andrew W. Johns
*Assistant Examiner*—Shervin Nakhjavan
(74) *Attorney, Agent, or Firm*—Venable LLP.; Norman N. Kunitz

(57) ABSTRACT

A method and a measuring system capable of real-time pickup of deformation images of a surface of a test object is provided. A plurality of mutually phase-shifted interferograms are generated. From these interferograms, a normalizing mask, which is stored in memory as a normalization data set, and a reference image are generated. Next, each speckle image generated is processed with the reference image to form a differential image that is linked with the normalizing mask. The normalizing mask can include a data set with pixel-specific normalization data. The pixels of the differential image are then divided by the respectively associated values of the normalization data set in order to generate a normalized stripelike image of the deformed surface.

33 Claims, 4 Drawing Sheets

METHOD AND APPARATUS FOR THE REAL TIME DETERMINATION OF DEFORMATION OF TEST PIECES

CROSS-REFERENCE TO RELATED APPLICATIONS

This application is a continuation of U.S. patent application Ser. No. 09/471,186, filed Dec. 23, 1999, currently abandoned and incorporated herein by reference in its entirety.

This application is also related to German Patent Application No. 198 59 801.7, filed Dec. 23, 1998, and incorporated herein by reference in its entirety.

FIELD OF THE INVENTION

The invention relates to an apparatus and a method capable of ascertaining and displaying deformations or shifts in test objects in real time.

BACKGROUND OF THE INVENTION

In some measurement tasks, the deformation or shifting, particularly of diffusely scattering object surfaces, must be detected precisely, for instance to examine the influence of an exertion of force on a test object. There is often a need to be able to follow the deformation of the test object or its surface directly, while the surface structure or shape itself occasionally does not matter. This is especially pertinent to practical conditions, that is, close to production and with the deformation of the surface being displayed in the clearest, most readily apparent and readily evaluatable possible form.

For detecting surface displacements or expansions of a test object whose surface scatters diffusely, strike projection methods, such as the moiré method, and interferometric methods are known, such as electronic speckle pattern interferometry (ESPI method) or the shearing method. While the moiré method is more useful for larger deformations or shifts, the interferometric methods are used particularly for measuring lesser travel distances but with greater resolution. There are no restrictions to object size in the speckle method.

From U.S. Pat. No. 4,660,978, a shearing interferometer with a fixedly adjusted mirror tilt is known for determining distortions of a wave front of an optical beam. The shearing interferometer has a beam splitter that splits the arising beam, which possibly has a curved wave front, into two split beams and reunites them. The two split beams are each reflected by mirrors. One of the mirrors is connected to an inclination device, while the other mirror is connected to a displacement device. The split beams reunited by the beam splitter are carried to a camera. For different mirror inclinations of the inclinable mirror, the displaceable mirror is then adjusted incrementally. From the brightness or intensity values that result at the camera, the phase relationship of the beam can be determined, and from this data pertaining to the curvature of the wave front can be calculated.

Similar devices can be used to examine deformations of object surfaces. For instance, two states of a test object are compared for the purpose, in which the object is picked up in two different load states and the interferograms of the two states are subtracted. The result is a differential interferogram, which, depending on the measurement principle employed, shows either the displacement or the expansion of the object between the two states in the form of lines of interference. The amount of displacement or expansion at a pixel of the differential interferogram can then be determined, for instance by counting the interference lines beginning at a pixel of known displacement or expansion and taking the wavelength of the light employed into account.

If the measuring head, in a similar way to the shearing method described above, is equipped with a phase shift unit, then an expanded evaluation can be performed by the principle of the phase shift method (W. Osten, "Digitale Verarbeitung und Auswertung von Interferenzbildern" [Digital Processing and Evaluation of Interference Patterns], Chapter 6, Akademieverlag, ISBN 3-05-501294-1). In it, phase images are generated that assign a certain phase angle to each pixel. If the phase images of two states of the object are subtracted, the result is a phase differential image. In contrast to the aforementioned differential interferogram, the phase differential image does not have sinusoidally modulated interference lines but instead directly indicates the phase difference angle between the two states of the object.

In the phase shift method, the object to be examined, if successive images of the same object's state are to be picked up in succession with a different phase relationship, must remain absolutely still.

To aid in this, German Patent DE 38 43 396 C1 discloses a method known as "direct phase measurement" or as the "spatial phase shift method". All that this method needs for calculating $2\pi$-modulated phase images is a grating projection and a camera image.

It is an assumption here that the period length in the striped pattern corresponds to a constant number of pixels, and that the background intensity of adjacent pixels is identical. This represents a rough approximation of actual conditions and leads to phase errors.

In testing technical objects, it is important to facilitate the evaluation of differential interferograms, so that defects in an object or other special features of the test object that can be detected by the deformation can be made clearly apparent. U.S. Pat. No. 5,091,776, teaches reconfiguring an obtained differential image before displaying it, or in other words, finding the amount of the difference pixel by pixel. The absolute value of the difference generated can furthermore be multiplied by a constant factor via an amplifier, and thus the overall image contrast can be varied.

Locally fluctuating light conditions can lead here to restricted evaluatability of the images obtained.

SUMMARY OF THE INVENTION

With this as the point of departure, it is the object of the invention to create an apparatus and a method capable of real-time ascertainment and display of deformations of test objects that furnish an improved image quality. This object is attained by the method and measuring system of the present invention.

In the method of the invention, in a first method step, the initial step, a normalization data set is generated from a set of phase-shifted images of the surface region of interest on the object; this data set contains normalization information specific for each pixel. This normalization data set is specific for the region of a object surface that is located in the viewing field of a picture taking device. The normalization data set is stored in memory and held in readiness for using the further post-treatment of the images taken of the same surface region. For each pixel, the normalization data set contains information about the amplitude with which the image brightness or intensity varies if a phase displacement is performed. Thus the normalization data set represents an amplification or normalization factor that is specific for each pixel. By applying this normalization data set to the differential images generated, an image suitable for display on a monitor is obtained that has equally good contrast at every detail of the image.

The method is suitable for measuring object deformations both by the stripe method and by speckle modulation, for instance. In both cases, a marked improvement in image quality compared to an uncorrected method is obtained.

In order to display a deformation of a test object compared with an initial state, it is expedient to store a reference image in memory that is utilized together with an image picked up currently for generating a differential image. It is possible to pick up moving object surfaces. If the measurement object moves during the period required by a camera to read out its image sensor, this does not fundamentally impede the picture taking. It is therefore possible to observe the test object continuously with the camera; the difference between the currently arriving image and the reference image stored in memory is formed pixel by pixel. These differential values calculated pixel by pixel are normalized using the applicable pixel-specific amplitude value of the stripe or speckle modulation and are displayed as a normalized differential value image.

In many cases, it is expedient to generate a quantitative value image pixel by pixel from the differential image. This improves the display. The zero crossover of the sinusoidal course of intensity of a speckle becomes black, and both positive and negative values are represented by gray values.

To determine an image to be displayed of the current state of the test object, only a current camera image and the reference image stored in memory in the computer, along with the normalization data set, are needed. The method is therefore capable of working in real-time; that is, pictures taken by the camera can be processed immediately and shown on the monitor. A suitably powerful computer system makes high image refresh rates possible.

Normalizing the gray values of the resultant image pixel by pixel makes the image measurable; that is, measurements can be taken in the resultant image, for instance, to determine structural defects. The image can also be displayed as a color picture. By eliminating the dependency of the resulting value $D_N(x,y)$ from the intensity amplitude $I_A(x,y)$, each automatic evaluation of the corrected pattern of interference lines is furthermore facilitated substantially, since now it may be assumed that $$D_N(x,y)=k \sin \Phi(x,y),$$

with a constant, location-independent value k for all pixels

To generate a normalization data set, that is, before the onset of reproduction of the motion of the object surface in the interference pattern or by means of stripe projection, preferably at least three, and preferably four, interference patterns or stripelike projection patterns of different phase relationships are picked up. To that end, a picture-taking device is, for instance, used that has a light source for lighting the object's surface with coherent light. Diffuse light backscattered from the object surface is picked up, for instance, with an interferometer, which splits the light detected by way of a lens into two split beams, which are then reunited and carried to a camera. One of the split beams is adjusted in a defined manner, for instance, by purposeful motion of a mirror with a suitable actuator, like a piezoelectric drive, so that a phase displacement between the split beams occurs. For instance, four images, each with a phase relationship offset by π/2, can be picked up. For each pixel, four brightness or intensity values are thus present, from which the brightness amplitude $I_A$ for the applicable pixel can be determined. Only for this provision, which is part of the preparatory step, does the object's surface have to remain still. Once an image that has been taken is stored in memory as a reference image and the normalization data set is determined, the object's surface can be moved somewhat. To generate a stripelike pattern that characterizes the motion of the object's surface, the new speckle pattern obtained is subtracted point by point from the reference image and, after optional quantification, divided point by point by the pixel-specific amplitude value. The order in which the normalization and subtraction or amount finding are done does not matter. It can also be reversed.

Once the individual images have been obtained from the picture taking unit by the speckle measuring technique, individual pixels can occur whose brightness value is phase-independent in the initial step. For these pixels, in an advantageous embodiment of the method and the measuring system, substitute values can be displayed. These substitute values can be formed from the neighboring points, for instance by averaging. It can also be advantageous for the resultant image, obtained by subtraction and normalization, to be smoothed with a low-pass filter. In this way, image noise can be reduced. It is furthermore possible for the resultant image to be scaled to the gray range that can be shown on a monitor.

Advantageous details of embodiments of the invention will become apparent from the drawings, the description, and the claims.

BRIEF DESCRIPTION OF THE DRAWINGS

Among other features, an exemplary embodiment of the invention is shown in the drawings. Shown are.

DETAILED DESCRIPTION OF PREFERRED EMBODIMENTS OF THE INVENTION

Figure 1:
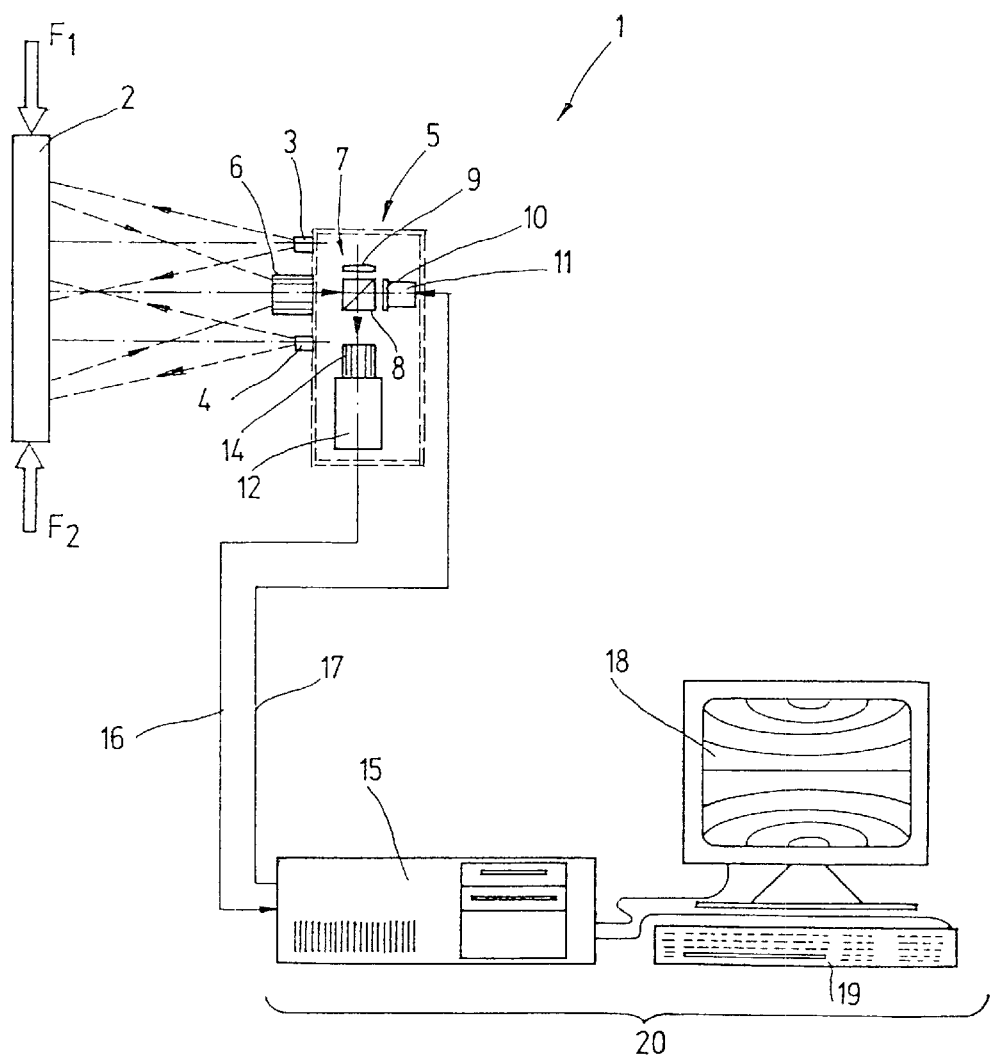
FIG. 1, a measuring system for real-time pickup of the deformation of a portion of the surface of an object, shown schematically.

In FIG. 1, a measuring system 1 is shown that is used to inspect the surface of test object 2 and its deformations. The test object 2 is lighted as uniformly as possible with laser light sources 3, 4. The laser light sources 3, 4 can be provided on a measuring head 5, embodied as a pickup unit, and can be supported in stationary fashion on it. The measuring head 5 can, if needed, be supported adjustably.

The measuring head 5 includes a lens 6, which picks up radiation backscattered diffusely from the surface of the object 2 and carries it to an optical system 7. The optical system is designed as an interferometer. The light output by the lens 6 reaches a beam splitter 8, which splits the arriving beam into two split beams. One mirror 9, 10 is assigned to each split beam. The mirror 10 is supported adjustably in the beam direction, that is, essentially parallel to its own normal direction. A piezoelectric adjuster element 11 is used for this purpose. The beams thrown back by the mirrors 9, 10 are superimposed by the beam splitter 8 to form a beam in which, depending on the form of the object surface and the positioning of the mirror 10, interference patterns develop. These interference patterns are picked up by a camera 12 with a suitable lens 14.

The measuring head 5 is connected to a computer 15, which is used for image processing and for controlling the measuring head 5. To that end, the camera 12 is connected to the computer 15 via a signal line 16, over which image signals are delivered to the computer 15. The piezoelectric adjuster element 11 is connected to the computer 15 over a signal line 17. The computer can thus control the phase relationship between the split beams in the interferometer 7.

The computer 15 includes a display device or monitor 18 and an input unit 19. The computer 15, monitor 18 and input unit 19 together form an image processing unit 20.

Figure 2:
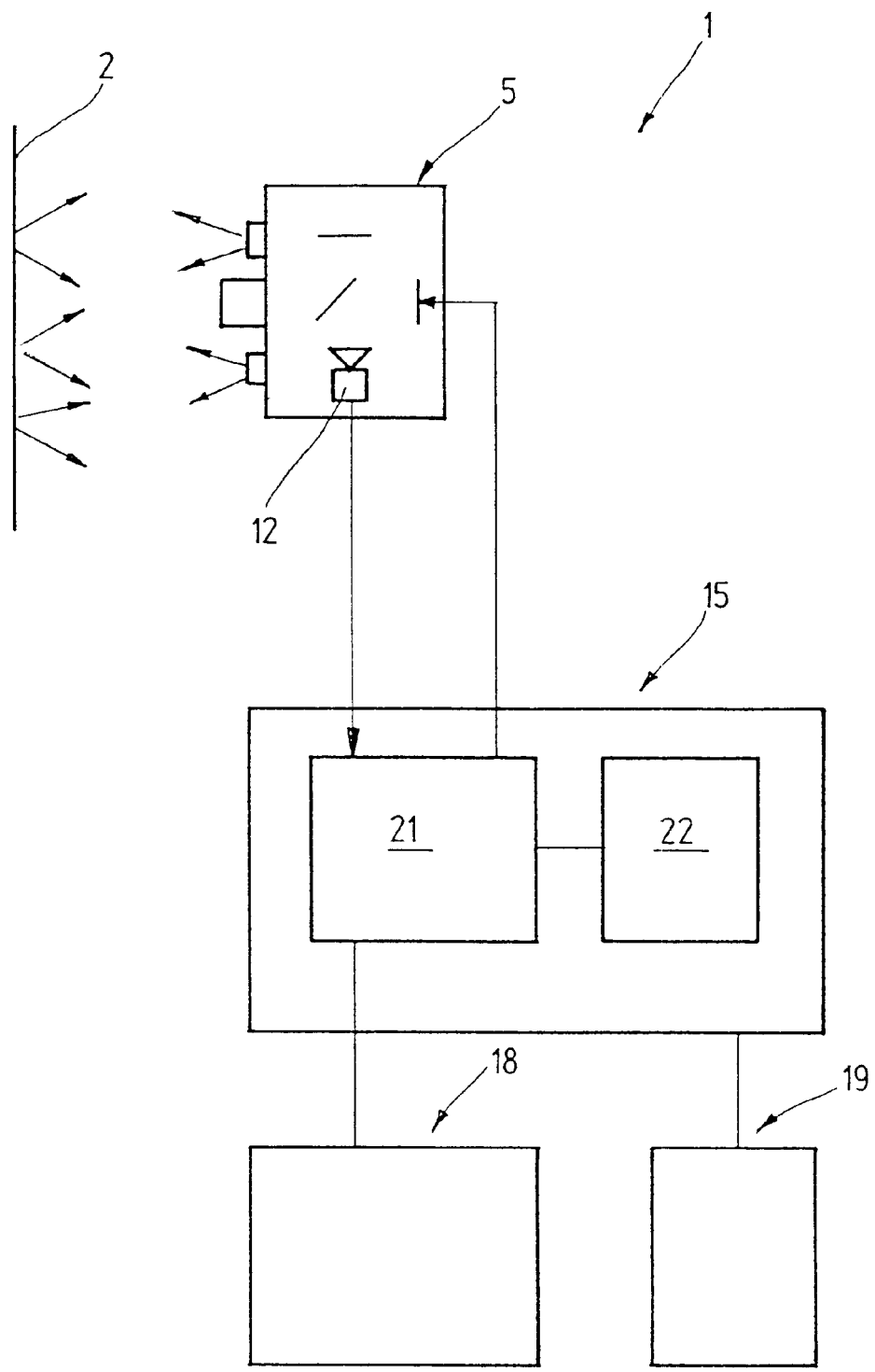
FIG. 2, the measuring system of FIG. 1, in the form of a fragmentary block circuit diagram.

As seen from FIG. 2, the computer essentially includes a computation unit 21 and a memory unit 22; the memory unit 22 can be subdivided into functionally and structurally different memory units.

With the measuring system 1 described thus far, the test object 2 or its surface is observed as follows:

First, the test object 2 is supported stationary and is acted upon by constant external forces $F_1$, $F_2$, as shown in FIG. 1. These forces can also be zero. The measuring or display method is now initiated with an initial step sequence in which a normalization data set is generated. During the initial step sequence, the surface of the test object 2 remains still. For performing the initial step sequence, the piezoelectric adjuster element 11 is moved into a position of repose, so that both mirrors 9, 10 are at rest. The light output by the laser light sources 3, 4 and backscattered from the object surface now creates interference in the interferometer 7 and produces a speckle pattern in the camera 12 that is picked up by the computation unit 21 and initially buffer-stored in the memory unit 22. Once the picture has been taken, the computation unit 21 transmits an adjusting signal to the piezoelectric adjuster element 11, causing the mirror 10 to shift, for instance, by one-quarter of the light wavelength or $\lambda/4$, or in other words $\pi/2$. The interference pattern (speckle pattern) detected by the camera 12 varies as a result. The individual speckles change their brightness value in sine-modulated fashion. The $\pi/2$-phase-displaced speckle pattern is now picked up. In a next step, still belonging to the initial step sequence, as soon as the $\pi/2$ image has been taken, the piezoelectric element 11 is adjusted by a further $\pi/2$ to the value of $\pi$. The speckle pattern now generated is now distinguished from the images generated previously and is transferred by the computation unit 21 to the memory unit 22. Finally, a $3\pi/2$-phase-displaced speckle pattern is also picked up. All four images are now s stored in memory in the memory unit 22. For each pixel (x, y), four measured values $I_1$, $I_2$, $I_3$, $I_4$ are now available. These behave as follows:

$I_1(x,y)=I_0(x,y)+I_A(x,y) \sin \Phi(x,y)$ $I_2(x,y)=I_0(x,y)+I_A(x,y) \sin (\Phi(x,y)+\pi/2)$ $I_3(x,y)=I_0(x,y)+I_A(x,y) \sin (\Phi(x,y)+\pi)$ $I_4(x,y)=I_0(x,y)+I_A(x,y) \sin (\Phi(x,y)+3\pi/2)$ in which
  $I_1(x,y)$=intensity of the pixel (x,y) of the non-phase displaced image;
  $I_2(x,y)$=intensity of the pixel (x,y) of the image phase-displaced by $\pi/2$;
  $I_3(x,y)$=intensity of the pixel (x,y) of the image phase-displaced by n; and
  $I_4(x,y)$=intensity of the pixel (x,y) of the image phase-displaced by $3\pi/2$;
  $I_0(x,y)$=background intensity of the applicable pixel (x,y);
  $I_A(x,y)$=intensity amplitude of the speckle modulation of the pixel (x,y), and
  $\Phi(x,y)$=phase angle of the pixel (x,y).

The intensity amplitude $I_A(x,y)$ of the speckle modulation of the applicable pixel (x,y) is then obtained as follows:

$$I_A(x, y) = \frac{1}{2}\sqrt{(I_1(x, y) - I_3(x, y))^2 + (I_2(x, y) - I_4(x, y))^2}.$$

If needed, however, the intensity amplitude can also be calculated from other combinations of images and phase displacement angles. For instance, instead of the four phase-displaced images, it is also possible to use only three images.

Once the intensity amplitude $I_A$ has been determined for each pixel, these amplitudes form a normalization data set, which for each pixel (x,y) contains a specific normalization datum. This normalization data set is stored in the memory unit 22. In addition, the last image $I_4(x,y)$, for instance, is stored as a reference image R(x, y) in the memory unit 22. The initial step sequence can be seen from FIG. 3. Once it has been executed, the actual display of the deformation can begin. To that end, in a repeating cycle, the image processing system 20 executes the following program steps:

A new image B(x,y) is received from the camera 12;

For all the pixels, the following operations are now performed:

The new image B(x,y) furnished by the camera 12 is subtracted from the stored reference image R(x,y). This creates the differential image D(x,y) point by point.

Each pixel D(x,y) of the differential image is divided by the intensity value $I_A(x,y)$ assigned to it, that is, the intensity value $I_A$ for the same pixel. The result is the normalized differential image $D_N(x,y)$. These operations are performed individually for each pixel.

The normalized differential image $D_N(x,y)$ is scaled to the gray value range.

Finally, the normalized and scaled differential image is displayed on the monitor 18.

Figure 4:
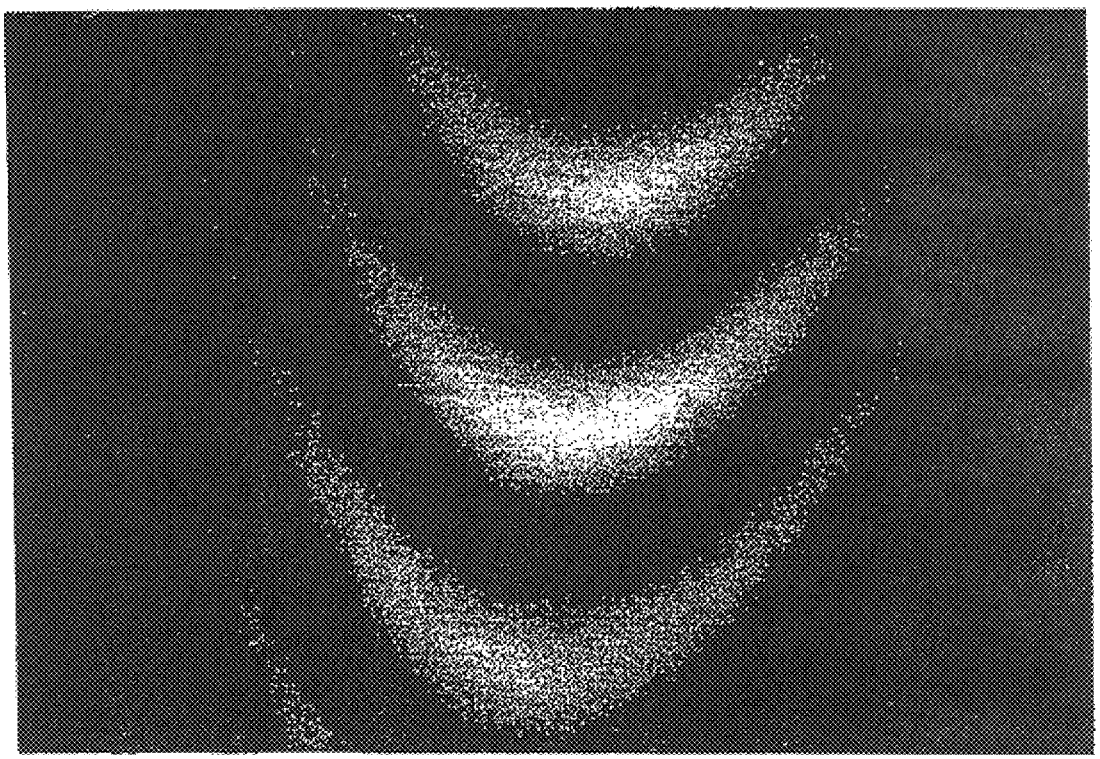
FIG. 4, a monitor image of a deformed object's surface, without applying a normalization data set to differential images generated.
Figure 5:
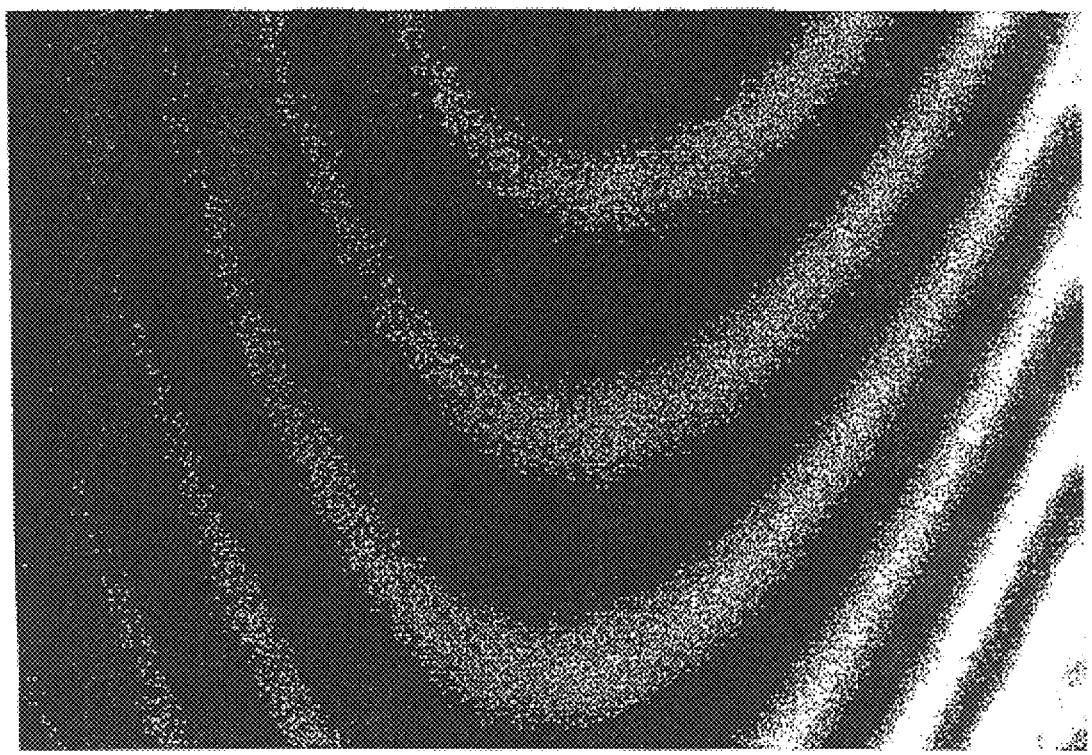
FIG. 5, a display of the deformation of an object's surface with post processing of a differential image obtained using a normalization data set.

While the reference image R(x,y) and the image B(x,y) taken by the camera are speckle patterns, the differential image D(x,y) is an image that, if the camera image B(x,y) differs from the reference image R(x,y), exhibits a clear stripelike pattern. If the images B(x,y) and R(x,y) are identical, then no shift in the surface of the object has taken place, and, independently of the form of the surface, an image of uniform coloration is generated, for example, a flat white image. Any shifting in the object surface, between the instant that the reference image R(x,y) is taken and the instant that the camera image B(x,y) is taken produces the aforementioned stripelike pattern. The stripes provided can be read like altitude lines; the number of stripes that can be counted characterizes the change in height of the object. After normalization of the differential image D(x,y), the normalized differential image $D_N(x,y)$ to be displayed on the monitor 18 results, which permits uniform contrast over its entire surface. This is independent of the local lighting and of the local reflection properties of the object's surface. This can be seen particularly from FIGS. 4 and 5. In FIG. 4, the differential image D(x,y) is shown, while FIG. 5 shows the normalized differential image $D_N(x,y)$. The clarity is clearly improved.

In a somewhat modified method, before or after the standardization, an absolute value image is formed from the differential image $D_N(x,y)$, by finding the value of the differential image $|D(x,y)|$ (or $|D_N(x,y)|$) point by point. This is then normalized, if it has not already been normalized, in order to generate the normalized differential image $D_N(x,y)$.

The camera 12 outputs the speckle patterns of the object's surface at a fixed frequency. Each image output by the camera 12 is processed by the algorithm explained above and is displayed on the monitor 18. If the object's surface moves during the picture taking, this does not interfere with the image processing or the image reproduction. If the individual pixels are picked up at staggered times from one another and if movement of the object's surface occurs during the picture taking, then deformations picked up in different image regions at different instants are displayed and reproduced on the monitor 18. At a high image scanning frequency and a high image reproduction frequency of 10, 16, or 25 Hz, for instance, this does not interfere with the image observation. The measuring system 1 is thus suitable for observing deformations of workpiece surfaces in real time.

Figure 3:
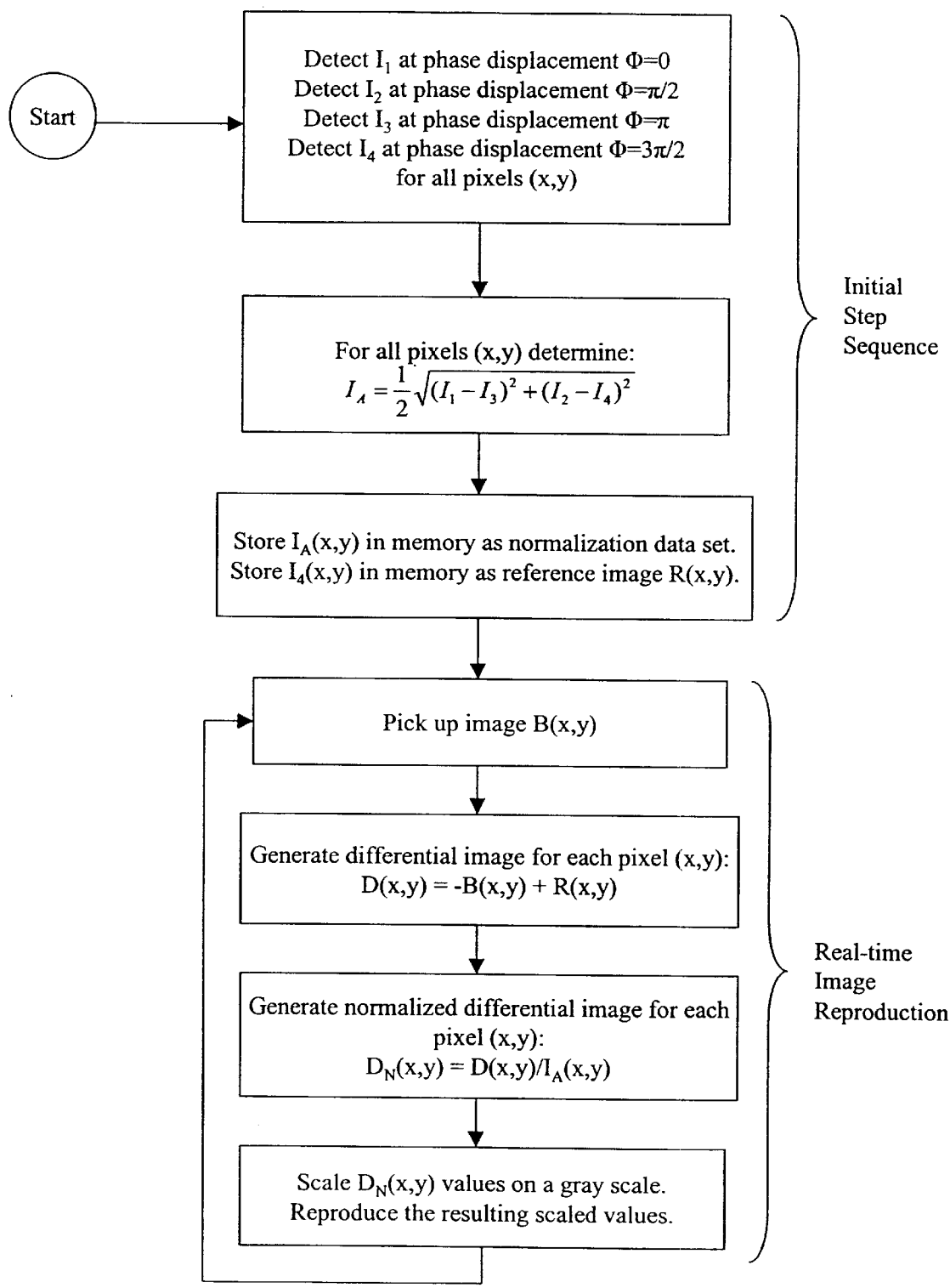
FIG. 3, a flow chart showing a sequence for image detection and conditioning of interference patterns picked up from an object.

If the measuring system is in the loop shown at the bottom of FIG. 3 for real-time image reproduction and the object is acted upon by alternating forces $F_1$, $F_2$, the resultant deformations of the object surface can be observed in the form of a stripelike pattern that appears on the monitor 18. With increasing deformation, the number and density of stripes increases. It is thus possible to directly trace how deformations occur. During the real-time image reproduction, no phase displacement should be performed with the mirrors 9, 10. For each individual image display, it suffices to pick up a single camera image.

The speckle patterns $B(x,y)$ include points or pixels that do not vary their brightness value when the mirror 10 is displaced. These special pixels can be discovered in the initial step sequence and, in a preferred embodiment of the method, are subjected to a separate treatment. The pixels that exhibit no modulation of intensity when the phase-displaced pictures are taken have the intensity amplitude of zero. In this case, the applicable pixel is assigned a brightness or intensity value that has been calculated from surrounding pixels. For instance, the arithmetic average can be selected. In this manner, one obtains as a result closed-surface image information that is not perforated by defects. The defects are specific to the particular object surface region that is being observed. They also exist at the same points for the subsequent real-time image reproduction as when the reference image was taken. To eliminate the defects, substitute values can be formed for the affected pixels from the surrounding pixels. Once again, the arithmetic average can, for instance, be used. The defect correction can be done in speckle interferometry only in the differential image. In the reference image R and in the image B the proximity relationship of the pixels is undefined.

A method and a measuring system capable of real-time pickup of deformation images of a object surface utilizes a speckle interferometer, with which initially, to prepare for the ensuing image processing and evaluation, a plurality of mutually phase-shifted interferograms are generated. From these interferograms, a normalizing mask, which is stored in memory as a normalization data set, and a reference image, which is also stored in memory, are generated. Next, for observation of the object surface as it becomes deformed, each speckle image generated is processed with the reference image to form a differential image that is linked with the normalizing mask. The normalizing mask can include a data set with pixel-specific normalization data. The pixels of the differential image are then divided by the respectively associated values of the normalization data set in order to generate a normalized stripelike image of the deformed surface. From the elements of the normalization data set, reciprocal values can be formed as needed in the preparation step, so that a multiplication operation can be employed in the normalization. This makes it considerably simpler and faster to form the normalized differential image $D_N(x,y)$ from the image $B(x,y)$ picked up. The forming of the reciprocal values, which is associated with an operation of division and requires comparatively more computation effort, needs to be performed only a single time at the onset of each real-time display in order to generate the normalization data set.

What is claimed is:

1. A method of ascertaining and displaying deformations in or displacements of test objects in real time, comprising the steps of:

in an initial step sequence, producing a normalization data set, $I_A(x,y)$, containing normalization information for each pixel (x,y) of an image of a test object based on a variance in a brightness of each pixel;

generating, based on at least two successively picked up images $R(x,y)$, $B(x,y)$ made up of pixels (x,y), a differential image $D(x,y)$; and correcting the brightness values of the pixels (x,y) of the differential image $D(x,y)$ using the normalization data set $I_A(x,y)$.

2. The method of claim 1, wherein the images are interference patterns, and further comprising the step of generating said interference patterns with the light reflected from or scattered by the surface of the test object.

3. The method of claim 2, wherein said step of producing a normalization data set $I_A(x,y)$ comprises the step of picking up at least three interference patterns or stripelike projection patterns in succession in different phase relationships, wherein each interference pattern or stripelike pattern has a brightness point by point that is dependent in sinusoidal fashion on the phase relationship of light picked up.

4. The method of claim 3, wherein the step of picking up at least three interference patterns or stripelike projection patterns comprises the step of picking up in succession an initial image $I_1(x,y)$ and three successive images, $I_2(x,y)$, $I_3(x,y)$, and $I_4(x,y)$, where $I_{n+1}(x,y)$ is offset by $\pi/2$ from $I_n(x,y)$, n=1, 2, 3, and the following equations apply:

$$I_1(x,y)=I_0(x,y)+I_A(x,y) \sin \Phi(x,y)$$
$$I_2(x,y)=I_0(x,y)+I_A(x,y) \sin(\Phi(x,y)+\pi/2)$$
$$I_3(x,y)=I_0(x,y)+I_A(x,y) \sin(\Phi(x,y)+\pi)$$
$$I_4(x,y)=I_0(x,y)+I_A(x,y) \sin(\Phi(x,y)+3\pi/2),$$

where $I_o(x,y)$ is a background intensity of pixel (x,y), $I_A(x,y)$ is an intensity amplitude of speckle modulation of pixel (x,y), and $\Phi(x,y)$ is a phase angle of pixel (x,y).

5. The method of claim 4, wherein the intensity amplitude value $I_A(x,y)$ to be arrived at for each pixel (x,y) is determined by adding squares of differences of measured values, $I_1(x,y)$ through $I_4(x,y)$, and taking the square root of the sum.

6. The method of claim 5, further comprising the step of forming for each intensity amplitude value $I_A(x,y)$ its reciprocal $1/I_A(x,y)$ and storing it in memory as a normalization value in the normalization data set.

7. The method of claim 1, wherein the images are stripelike projection patterns, and further comprising the step of generating said stripelike projection patterns by illuminating the surface of the test object with stripelike light.

8. The method of claim 7, wherein said step of producing a normalization data set $I_A(x,y)$ comprises the step of picking up at least three interference patterns or stripelike projection patterns in succession in different phase relationships, wherein each interference pattern or stripelike pattern has a brightness point by point that is dependent in sinusoidal fashion on the phase relationship of light picked up.

9. The method of claim 8, wherein the step of picking up at least three interference patterns or stripelike projection patterns comprises the step of picking up in succession an initial image $I_1(x,y)$ and three successive images, $I_2(x,y)$, $I_3(x,y)$, and $I_4(x,y)$, where $I_{n+1}(x,y)$ is offset by $\pi/2$ from $I_n(x,y)$, n=1, 2, 3, and the following equations apply:

$$I_1(x,y)=I_0(x,y)+I_A(x,y) \sin \Phi(x,y)$$

$$I_2(x,y)=I_0(x,y)+I_A(x,y) \sin(\Phi(x,y)+\pi/2)$$

$$I_3(x,y)=I_0(x,y)+I_A(x,y) \sin(\Phi(x,y)+\pi)$$

$$I_4(x,y)=I_0(x,y)+I_A(x,y) \sin(\Phi(x,y)+3\pi/2),$$

where $I_0(x,y)$ is a background intensity of pixel (x,y), $I_A(x,y)$ is an intensity amplitude of speckle modulation of pixel (x,y), and $\Phi(x,y)$ is a phase angle of pixel (x,y).

10. The method of claim 9, wherein the intensity amplitude value $I_A(x,y)$ to be arrived at for each pixel (x,y) is determined by adding squares of differences of measured values, $I_1(x,y)$ through $I_4(x,y)$, and taking the square root of the sum.

11. The method of claim 10, further comprising the step of forming for each intensity amplitude value $I_A(x,y)$ its reciprocal $1/I_A(x,y)$ and storing it in memory as a normalization value in the normalization data set.

12. The method of claim 1, wherein said step of generating comprises the steps of:

picking up and storing in memory a reference image R(x,y);

picking up, on an ongoing basis, additional images B1(x,y), B2(x,y), B3(x,y), . . . ; and processing each of said additional images with said reference image to produce a differential image D(x,y) or |D(x,y)|.

13. The method of claim 10, wherein said step of correcting comprises the step of correcting each said differential image D(x,y) or |D(x,y)| with the normalization data set $I_A(x,y)$ or with its reciprocal $1/I_A(x,y)$ to obtain a resultant image; and wherein the method further comprises the step of reproducing each resultant image in succession on a monitor.

14. The method of claim 13, further comprising the step of low-pass filtering the resultant image before displaying it.

15. The method of claim 14 wherein the normalized and filtered resultant image is used for computer-supported determination of properties of the test object.

16. The method of claim 15, wherein one of said properties is structural defects.

17. The method of claim 12, wherein the reference image R(x,y) remains unchanged during a sequence of images B1(x,y), B2(x,y), B3(x,y), . . . picked up in succession from a moving test object surface.

18. The method of claim 13, further comprising the step of scaling the resultant image in such a way that a gray range that can be displayed by an image reproduction system is utilized completely.

19. The method of claim 1, wherein said step of correcting comprises the step of dividing by a value $I_A(x,y)$ or multiplying by a value $1/I_A(x,y)$ the brightness value, D(x,y) or |D(x,y)|, of each pixel (x,y) of said differential image.

20. The method of claim 1, wherein the normalization data set remains unchanged during a sequence of images picked up in succession from a moving test object surface.

21. The method of claim 1, further comprising the step of, at the pixels (x,y) at which brightness remains unchanged, forming substitute values that are used for the visual display of the image of the test object.

22. The method of claim 21, wherein the substitute values are formed from surrounding pixel values.

23. The method of claim 22, wherein the substitute values are formed by averaging values of the surrounding pixels.

24. A measuring system capable of ascertaining and displaying deformations in or displacements of test objects in real time, comprising:

a pickup unit, which detects a pattern that is dependent on the surface form and/or surface properties of a test object, and which generates signals corresponding to the pattern, signals being dependent on a deformation and/or shift in the surface of the test object;

an image processing unit, comprising a computation unit and a memory unit, the image processing unit generating, from a first image or a first series of images, a normalization data set $I_A(x,y)$ for each pixel in the image based on a variance in a brightness in each pixel, which is stored in the memory unit and with which the computation unit combines each further image B(x,y) point by point; and a display device, on which images picked up by the pickup unit and post-processed by the computation unit are displayed.

25. The measuring system of claim 24, wherein the display unit displays images $D_N(x,y)$ post-processed by the computation unit.

26. The measuring system of claim 24, wherein the image processing unit generates a reference image R(x,y), with which all subsequently picked-up images B(x,y) are to be combined, after which the differential image D(x,y) formed by combining R(x,y) and B(x,y) is combined point by point with the normalization data set $I_A(x,y)$.

27. The measuring system of claim 26, wherein R(x,y) and B(x,y) are combined by forming a point-by-point difference between them to obtain differential image D(x,y).

28. The measuring system of claim 26, wherein the normalization data set $I_A(x,y)$ is applied by the computation unit to each differential image D(x,y).

29. The measuring system of claim 28, wherein the computation unit divides the brightness values associated with the pixels (x,y) of the differential image D(x,y) by the respectively associated values of the normalization data set $I_A(x,y)$ or multiplies them by a preferably previously calculated reciprocal value $1/I_A(x,y)$.

30. The measuring system of claim 29 wherein the computation unit forms the normalization data set by taking, on a pixel-by-pixel basis, a square root of a sum of two squared differences between pairs of image values measured with different phase offsets.

31. The measuring system of claim 24, wherein the pickup unit comprises an interferometer.

32. The measuring system of claim 31, wherein the interferometer comprises a phase modulator.

33. The measuring system of claim 24, wherein the pickup unit comprises a device that provides stripelike lighting.

* * * * *